US012266023B2

(12) United States Patent
Schneider et al.

(10) Patent No.: US 12,266,023 B2
(45) Date of Patent: *Apr. 1, 2025

(54) GENERATING PLAYLISTS FOR A CONTENT SHARING PLATFORM BASED ON USER ACTIONS

(71) Applicant: Google LLC, Mountain View, CA (US)

(72) Inventors: Michael Patrick Schneider, Venice, CA (US); Benoît de Boursetty, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,863

(22) Filed: Nov. 14, 2022

(65) Prior Publication Data
US 2023/0073856 A1   Mar. 9, 2023

Related U.S. Application Data

(63) Continuation of application No. 17/216,549, filed on Mar. 29, 2021, now Pat. No. 11,501,387, which is a
(Continued)

(51) Int. Cl.
*G06Q 50/00* (2012.01)
*G06F 16/638* (2019.01)
(Continued)

(52) U.S. Cl.
CPC ........... *G06Q 50/01* (2013.01); *G06F 16/639* (2019.01); *G06Q 30/00* (2013.01); *G06Q 30/0631* (2013.01)

(58) Field of Classification Search
CPC .... G06Q 50/01; G06Q 30/00; G06Q 30/0631; G06F 16/639
See application file for complete search history.

(56) References Cited

U.S. PATENT DOCUMENTS 8,078,688 B2   12/2011  Ansari
9,165,282 B2   10/2015  Fischer
(Continued)

FOREIGN PATENT DOCUMENTS

CN   101561820 A   10/2009
CN   101681252 A    3/2010
(Continued)

OTHER PUBLICATIONS

International Searching Authority, "Notification of Transmittal of the International Search Report and the Written Opinion of the International Searching Authority, or the Declaration," for International Application No. PCT/US2014/059714, mailed Jan. 9, 2015, 7 pages.
(Continued)

*Primary Examiner* — Dhairya A Patel
(74) *Attorney, Agent, or Firm* — Lowenstein Sandler LLP

(57) ABSTRACT

A method of updating a playlist for a first user includes identifying a client device associated with the first user of a content sharing platform that comprises a plurality of media items, identifying a first playlist of the first user, the first playlist including a first subset of media items, identifying a second subset of media items of the second user, detecting an action performed by the first user with respect to at least one media item of the second subset of media items of the second user, the action performed by the first user indicates interest of the first user in the at least one media item of the second user, and automatically adding the at least one media item of the second user to the first playlist of the first user.

18 Claims, 8 Drawing Sheets

Related U.S. Application Data continuation of application No. 14/051,322, filed on Oct. 10, 2013, now Pat. No. 10,963,973.

(51) Int. Cl.
*G06Q 30/00* (2023.01)
*G06Q 30/0601* (2023.01)

(56) References Cited

U.S. PATENT DOCUMENTS

| | | | |
|---|---|---|---|
| 9,225,580 | B2 | 12/2015 | Rich |
| 9,317,179 | B2 | 4/2016 | Ho |
| 9,396,195 | B1* | 7/2016 | Beguelin ............ H04N 21/4788 |
| 10,963,973 | B2* | 3/2021 | Schneider ............. G06Q 30/00 |
| 11,294,619 | B2 | 4/2022 | Usher |
| 11,501,387 | B2* | 11/2022 | Schneider .......... G06Q 30/0631 |
| 2008/0147711 | A1* | 6/2008 | Spiegelman ........ G06F 16/4387 |
| | | | 707/999.102 |
| 2008/0229215 | A1 | 9/2008 | Baron |
| 2008/0250067 | A1 | 10/2008 | Svendsen |
| 2008/0320139 | A1 | 12/2008 | Fukuda |
| 2009/0292376 | A1 | 11/2009 | Kazem |
| 2009/0327437 | A1 | 12/2009 | Estrada |
| 2010/0023578 | A1* | 1/2010 | Brant .................... G06F 16/639 |
| | | | 726/4 |
| 2010/0088327 | A1* | 4/2010 | Holm ................. G06F 16/4387 |
| | | | 707/758 |
| 2010/0235328 | A1 | 9/2010 | Sukanen |
| 2011/0314388 | A1* | 12/2011 | Wheatley ............. H04L 51/224 |
| | | | 715/751 |
| 2012/0036524 | A1 | 2/2012 | Mugulavalli |
| 2013/0018960 | A1 | 1/2013 | Knysz et al. |
| 2013/0031162 | A1 | 1/2013 | Willis |
| 2013/0031216 | A1* | 1/2013 | Willis ................. H04L 65/1069 |
| | | | 709/219 |
| 2013/0073568 | A1 | 3/2013 | Federov |
| 2013/0073584 | A1* | 3/2013 | Kuper .................... H04L 67/10 |
| | | | 707/769 |
| 2013/0073979 | A1 | 3/2013 | Shepherd |
| 2013/0073983 | A1* | 3/2013 | Rasmussen ............ G06Q 30/02 |
| | | | 715/753 |
| 2013/0268593 | A1* | 10/2013 | Parekh ............... G06Q 30/0631 |
| | | | 709/204 |
| 2013/0290402 | A1 | 10/2013 | Gavade |
| 2013/0332532 | A1 | 12/2013 | Bernhardsson |
| 2013/0332842 | A1 | 12/2013 | Bernhardsson |
| 2013/0332959 | A1 | 12/2013 | Kothari |
| 2014/0074924 | A1 | 3/2014 | Yim |
| 2014/0281977 | A1* | 9/2014 | Schupak .............. G06F 16/4387 |
| | | | 715/716 |
| 2015/0026338 | A1 | 1/2015 | Holmes |
| 2015/0106444 | A1 | 4/2015 | Schneider |
| 2022/0188273 | A1 | 6/2022 | Koorapati |

FOREIGN PATENT DOCUMENTS

| | | |
|---|---|---|
| CN | 102262457 A | 11/2011 |
| CN | 102947827 A | 2/2013 |

OTHER PUBLICATIONS

Extended European Search Report for Application No. 14851821.0 dated Feb. 14, 2017, 6 pages.
China Patent Application No. 201480055577.0 Office Action dated Feb. 7, 2018, 39 pages.
China Patent Application No. 201480055577.0 Office Action dated Sep. 27, 2018, 22 pages.

* cited by examiner

GENERATING PLAYLISTS FOR A CONTENT SHARING PLATFORM BASED ON USER ACTIONS

RELATED APPLICATIONS

This application is a continuation application of co-pending U.S. patent application Ser. No. 17/216,549, filed Mar. 29, 2021, which claims priority to U.S. patent application Ser. No. 14/051,322, filed Oct. 10, 2013, now U.S. Pat. No. 10,963,973, each of which is herein incorporated by reference.

TECHNICAL FIELD

Embodiments of the present disclosure relate to the field of content sharing and, more particularly, to creating playlists for a content sharing platform.

BACKGROUND

On the Internet, social networks allow users to connect to and share information with each other. Many social networks include a content sharing aspect that allows users to upload, view, and share content such as media items. Such media items may include audio clips, movie clips, TV clips, and music videos, as well as amateur content such as video blogging, short original videos, pictures, photos, other multimedia content, etc. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos. Users may use computing devices (such as smart phones, cellular phones, laptop computers, desktop computers, netbooks, tablet computers) to use, play, and/or consume media items (e.g., watch digital videos, and/or listen to digital music).

A content sharing platform can include one or more channels that may be viewable over the Internet. A channel is a mechanism for providing certain media items and/or for providing access to media items to subscribers. Media items for the channel can be selected by a user, uploaded by a user, selected by a content provider, or selected by a broadcaster. Users can subscribe to one or more channels. Upon subscribing, the user can view his or her subscriptions from the homepage of the content hosting site or from a user interface by clicking on a "Subscriptions" link/button. With many channels and even more media items associated with a content sharing platforms or viewable over the Internet, it may be difficult for a user to find new media items to consume and/or to decide which media items to consume.

Currently, users are spending increased amounts of time on content sharing platforms. Similar to a television or radio experience, users typically prefer to watch or listen to content without interruptions or having to decide what to watch next. Some content sharing platforms allow users to create playlists that allow the user to create a list of favorite media items to automatically play without interruption. However, generation of such playlists is a manual process that can take time and resources to understand and enable. Moreover, these playlists are generally finite and quickly get repetitive and outdated as channels continually release new material. User interests may vary when consuming content and the manually-generated static playlist cannot capture the user's dynamic interests.

SUMMARY

The below summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one embodiment, a method for generating playlist is presented. The method may identify a first user of a content sharing platform, where the content sharing platform comprises a plurality of media items. The method may also identify a subset of the plurality of media items based on social interactions between the first user and one or more entities and/or based on actions performed by the first user where the actions are associated with one or more media items of the content sharing platform. The method may generate a playlist based on the subset of the plurality of media items and provide the playlist to the first user.

In one embodiment the method may receive an indication to activate the playlist from the first user may provide the first user with access to media items in the playlist. In another embodiment, the method may determine that the first user has not accessed the playlist for a threshold period of time and may delete the playlist. In a further embodiment, the method may determine that the first user has not viewed a first media item from the playlist for a threshold period of time and may remove the first media item from the playlist.

In one embodiment, the method may generate a plurality of affinity scores based on user interactions between the first user and the one or more entities, each affinity score indicative of a level of connection between the first user and one entity from the one or more entities. The method may also identify a subset of the one or more entities based on the plurality of affinity scores. The method may also identify the subset of the plurality of media items based on the subset of the one or more entities.

In additional embodiments, computing devices for performing the operations of the above described embodiments are also implemented. Additionally, in embodiments of the disclosure, a computer readable storage media may store instructions for performing the operations of the embodiments described herein.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

Embodiments of the disclosure pertain to generating one or more playlists for a user of a content sharing platform. Because of the large number of media items and channels that are currently available on the Internet (e.g., the Web and/or other networks), users may often have difficulty choosing and/or finding new media items to consume. Embodiments of the present disclosure may automatically generate playlists for the user. Socials interactions between the user and other entities (such as other users of the content sharing platform or users of a social connection platform) may be analyzed. The user's actions associated with media items and/or channels may also be analyzed. The playlist may be generated based on the social interactions and/or the user's action associated with media items and/or channels. For example, based on a user's subscription to a channel, a playlist including other media items from the channel may be generated. The playlist may be modified or deleted if the user does not access the playlist and/or does not consume media items in the playlist within a threshold period of time. The embodiments described herein may allow the user to more easily and more quickly consume media items without manually searching for media items and/or without manually generating playlists.

Figure 1:
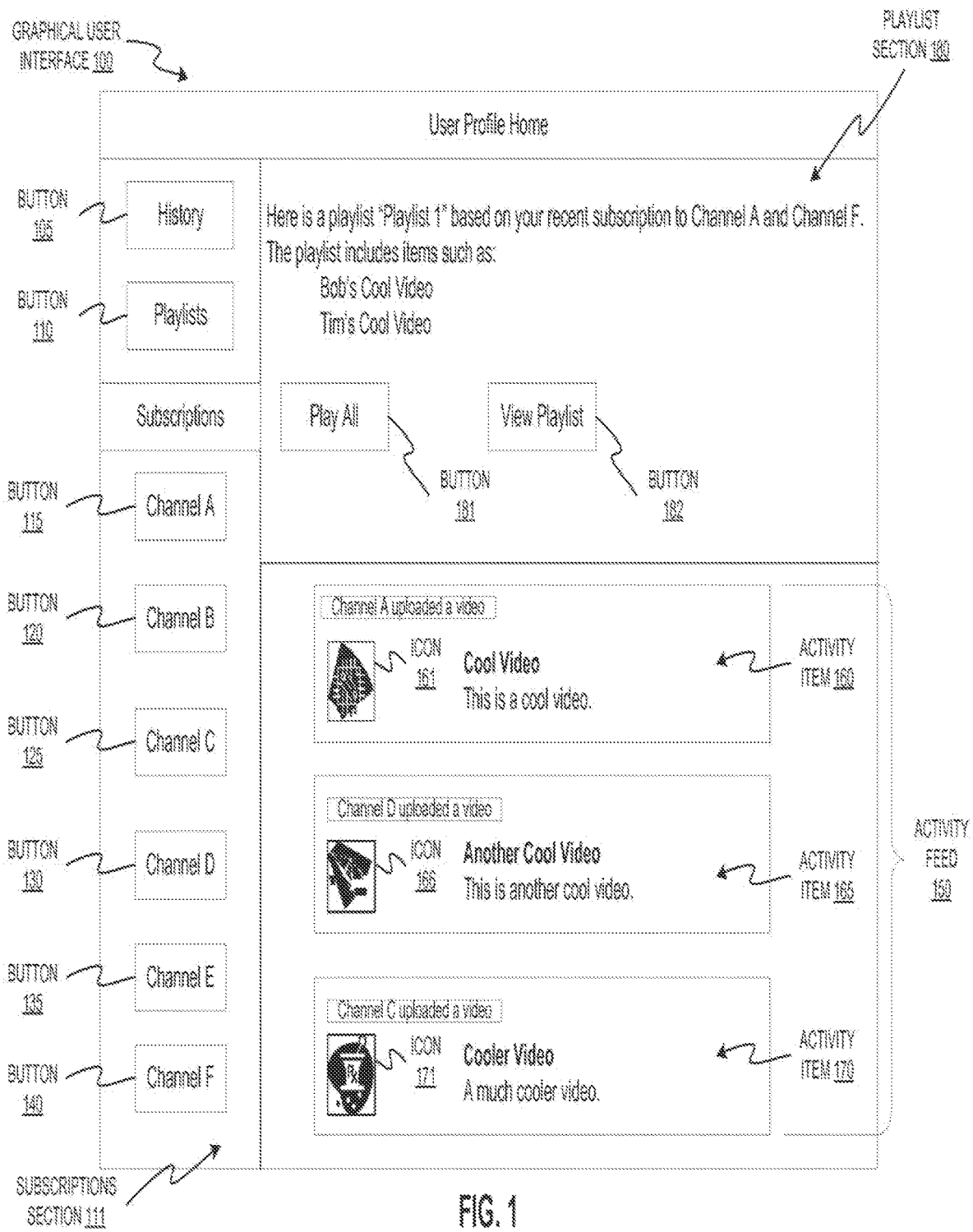
FIG. 1 is a diagram illustrating an example graphical user interface (GUI), in accordance with one embodiment of the present disclosure.

FIG. 1 is a diagram illustrating an example graphical user interface (GUI) 100 in accordance with one embodiment of the present disclosure. In one embodiment, the GUI 100 may be a homepage (e.g., a main page) of a user of a content sharing platform. For example, the GUI 100 may be presented by and/or displayed within a web browser when the user accesses or logs into the content sharing platform via the web browser. In another embodiment, the GUI 100 may be a home interface or a main interface presented by a media viewer (e.g., an app, an application, a program, a software module/component, etc., that may be used to view, play, and/or consume media items). Although the GUI 100 is illustrated using buttons (e.g., buttons 105, 110, 115, etc.), other embodiments may use links and/or other graphical user interface controls or elements in place of one or more of the buttons.

The GUI 100 includes buttons 105 and 110. Button 105 may allow the user to view a history of the media items that the user has consumed (e.g., viewed or played). For example, when the user selects and/or activates the button 105, a new GUI that includes a list of the last (e.g., ten, twenty, fifty or hundred) media items viewed by the user may be presented to the user. The button 110 may allow a user to view different playlists of media items that the user has previously created and/or obtained. A playlist may be a list and/or an order of different media items that can be viewed in sequential or shuffled order without interaction from the user. A media viewer (e.g., a media viewer application and/or a web browser) may play the media items on a playlist in the order in which the media items are listed on the playlist. A user may also transition between media items on a play list. For example, a user may wait for the next media item on the playlist to play or may select a particular media item in the playlist.

The GUI 100 also includes a subscriptions section 111 that includes a list of one or more channels that the user is currently subscribed to. In one embodiment, the subscriptions section 111 may include a list of all channels to which the user is subscribed to. In another embodiment, the subscriptions section 111 may include a subset of channels to which the user is subscribed to. For example, the subscriptions section 111 may present a predefined number of channels (e.g., 5 channels), the channels that the user accesses most frequently, the channels that the user has accessed most recently, the channels that the user has most recently subscribed to, etc. Other mechanisms of determining the channels to include in a subset of channels displayed can be used without departing from the scope of the disclosure. As illustrated in FIG. 1, the subscriptions section 111 includes buttons 115, 120, 125, 130, 135, 140 and 140. Button 115 is labeled "Channel A" to indicate that that user is subscribed to Channel A, button 120 is labeled "Channel B" to indicate that that user is subscribed to Channel B, button 125 is labeled "Channel C" to indicate that that user is subscribed to Channel C, button 130 is labeled "Channel D" to indicate that that user is subscribed to Channel D, button 135 is labeled "Channel E" to indicate that that user is subscribed to Channel E, and button 140 is labeled "Channel F" to indicate that that user is subscribed to Channel F. In one embodiment, a list of media items in a channel may be presented to the user when the user activates a corresponding button for the channel. For example, if the user activates (e.g., clicks on or selects) button 135, the GUI 100 may display a list of videos that are in Channel E. In one embodiment, when a user activates (e.g., clicks, selects, etc.) one of the buttons 115 through 140, a menu may appear on the GUI 100 listing media items associated with the channel associated with the activated button. In another embodiment, when a user activates (e.g., clicks, selects, etc.) one of the buttons 115 through 140, a popup window including a graphic representation (e.g., picture of a single frame from the media item) of media items in the channel associated with the activated button may appear on the GUI 100. It should be understood that in other embodiments, other visual indicators such as graphic representations, and/or text can be presented to a user to provide channels to the user.

Figure 3:
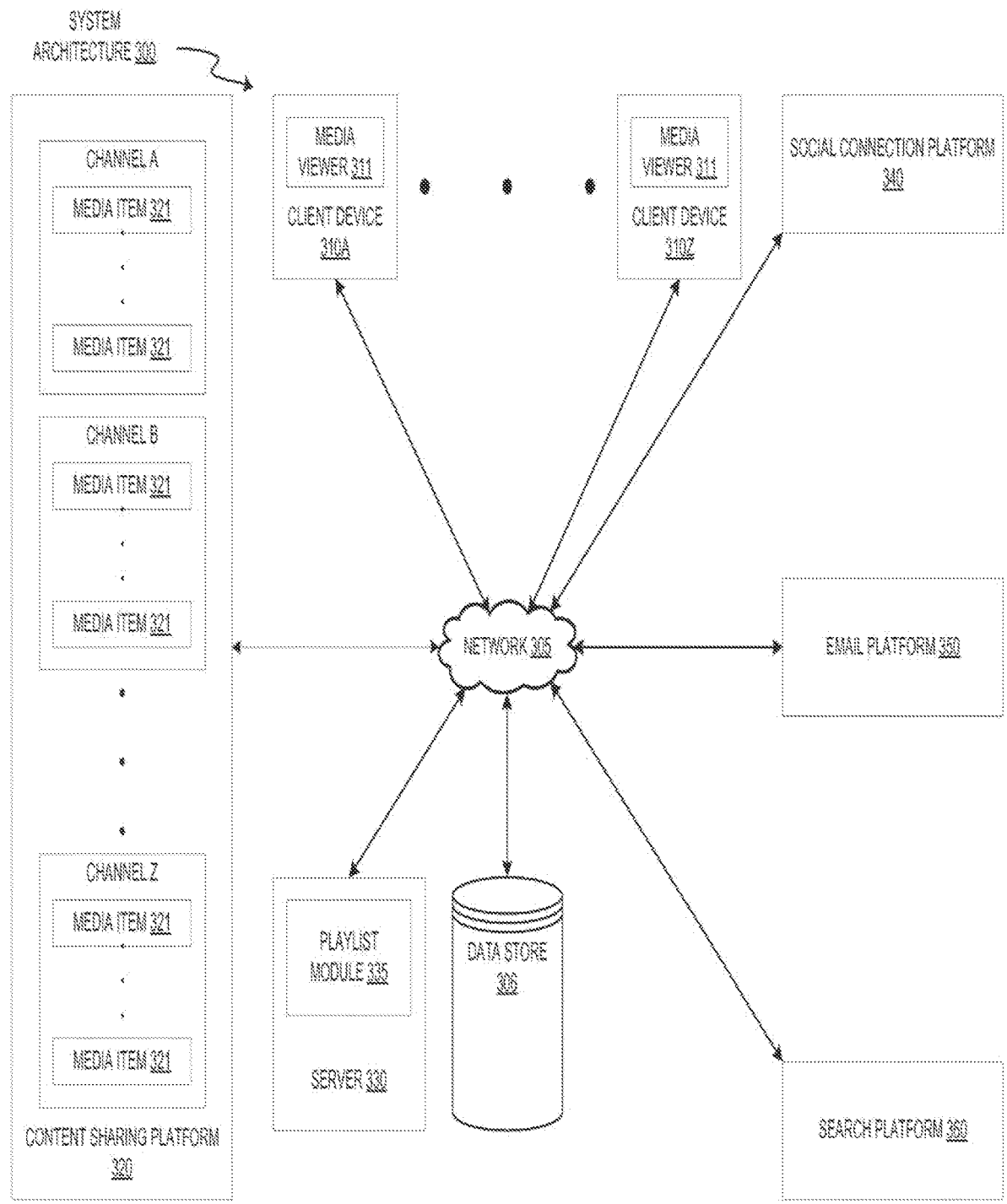
FIG. 3 illustrates an example system architecture, in accordance with one embodiment of the present disclosure.

The GUI 100 also includes a playlist section 180. Playlist section 180 includes information associated with a playlist that has been generated for the user. In one embodiment, the playlist may be generated for the user based on the user's social interactions between one or more entities and/or based on the user's actions associated with one or more media items of the content sharing platform. An entity may be another user of the content sharing platform or a user of a social connection platform (as illustrated in FIG. 3). The other user of the content sharing platform may be a professional content provider (e.g., a professional content creator, a professional content distributor, a content rental service, a television (TV) service, etc.) or an amateur individual. The playlist section 180 includes information (e.g., text) indicating that a playlist titled "Playlist 1" has been generated for the user based on the user's subscription to Channel A and Channel F. The playlist section 180 also includes information (e.g., text) indicating one or more of the media items (e.g., videos, music, etc.) that may be included in Playlist 1. For example, the playlist section 180 includes titles for two media items (e.g., videos) that are in the playlist, "Bob's Cool Video" and "Tim's Cool Video." In other embodiments, the playlist section 180 may include additional information. For example, the playlist section 180 may include images, icons, and graphics, to represent the playlist and/or one or more media items included in the playlist. In other embodiments, more or less information (e.g., text, images, icons, graphics, etc.) may be included in the playlist section 180. For example, the playlist section 180 may not include the title of the playlist (e.g., may not include the title Playlist 1). In another example, the playlist section 180 may not indicate why the playlist was generated for the user (e.g., may not indicate that the playlist is generated based on the user's subscription to Channel A and Channel F). In a further example, the playlist section 180 may indicate a different number of reasons why the playlist was generated for the user (e.g., may indicate that the playlist is generated based on one or more of the user's social interactions with other entities or actions associated with media items and/or channels).

The playlist section 180 also includes button 181 and button 182. When a user activates (e.g., clicks, selects, etc.) button 181, a media player (as discussed below in conjunction with FIG. 2) may begin playback of the media items included in Playlist 1. For example, the media player may begin playback of the media items included in Playlist 1 starting at the first media item on the playlist. In another example, the media player may begin playback of the media items included in Playlist 1 at any media item (e.g., may being playback starting at the third media item, or the eleventh media item, etc.). The button 182 may allow user to view the media items that are included in Playlist 1. For example, when the user activates (e.g., clicks or selects) the button 182, another GUI (e.g., a pop-up window, a new window frame, a window that may overlay the GUI 100, etc.) may be presented to the user. The other GUI may include data and/or information identifying the media items in the Playlist 1. For example, the other GUI may include text, images, icons, titles of media items, descriptions of media items, and/or information about the entities that provided (e.g., uploaded) the media items to the content sharing platform.

In one embodiment, the user may view Playlist 1 and/or the media items included in Playlist 1 using button 110. As discussed above, the button 110 may allow a user to view different playlists of media items that the user has previously created and/or obtained. The button 110 may also allow the user to view playlists (e.g., Playlist 1) that have been generated for the user based on the user's social interactions between one or more entities and/or based on the user's actions associated with one or more media items of the content sharing platform. For example, the content sharing platform may generate multiple playlists (e.g., Playlist 1, Playlist 2, etc.) for the user based on the user's social interactions between one or more entities and/or based on the user's actions associated with one or more media items of the content sharing platform. The user may use, access, and/or view these playlists using the button 110. When the user activates button 110, the user may be presented with another GUI that includes information (e.g., text, images, icons, graphics, lists, links, etc.) that allow the user to view different playlists and/or the media items included in the different playlists.

In one embodiment, the content sharing platform may generate Playlist 1 (or other playlist) based on the users action associated with one or more media items of the content sharing platform. For example, if a user indicates an approval of a media item (e.g., "likes" a media item), the content sharing platform may identify the entity (e.g., another user) that uploaded and/or provided the media item to the content sharing platform. The content sharing platform may identify other media items that the same entity has uploaded and may include one or more of those media items in Playlist 1. In another example, if the user subscribes to a channel, the content sharing platform may identify other media items that are included in the channel and/or associated with the channel. The content sharing platform may include those other media items in Playlist 1.

In another embodiment, the content sharing platform may generate Playlist 1 (or other playlists) for the user based on social interactions that the user has with other entities (e.g., other users of the content sharing platform and/or other platforms). For example, the content sharing platform may identify other users that communicate with the user (e.g., other users that the user emails, other users that the user chats with, other users that the user communicates messages with using a social connection platform, etc.). Examples of social interactions may include, but are not limited to, communicating with another user (e.g., a chat message, an email, a text message, a short message service (SMS) message), indicating an approval of a comment, a post, commenting on a post, replying to a post, and/or an action of another user on the content sharing platform and/or a social connection platform, establishing a connection with a user on a social connection platform (e.g., "friending" a user, adding a user as a friend, following a user, adding the user as a social connection, etc.), etc. The content sharing platform may identify channels and/or media items that belong to the other users and/or channels that the other users may be subscribed to. The content sharing platform may also identify media items that the other users have previously consumed (e.g., viewed and/or listened to). The content sharing platform can generate a playlist (e.g., Playlist 1) based on the other media items that belong to the other users and/or that the other users have previously consumed. In another example, the content sharing platform may also analyze the interactions (e.g., analyze the emails, chats, messages, and/or posts) to generate playlists that may include media items that are of interest to the user. In another embodiment, the content sharing platform may generate playlists based on user input provided by the user. For example, the user may voluntarily provide input indicating the user's interests, preferences, likes, dislikes, hobbies, employment, geographical location, personal information, and/or other demographic information. The content sharing platform may identify media items that may be of interest to the user based on the personal information and/or other demographic information voluntarily provided by the user.

The content sharing platform may also collect demographic information pertaining to groups of users (e.g., age of user groups, geographical information such as country, state, city of user groups) and may store the information in one or more data stores (e.g., hard disks, memories, databases, etc.). In situations in which the embodiments discussed herein collect personal information and/or demographic about users, or may make use of personal information and/or demographic information, the user may be provided with an opportunity to control whether programs or features collect entity information (e.g., information about a user's social network, social actions or activities, profession, a user's preferences, or a user's current location), or to control whether and/or how to receive content from the content sharing platform that may be more relevant to the user. In addition, certain data may be treated in one or more ways before it is stored or used, so that personally identifiable information is removed. For example, an user's identity may be treated so that no personally identifiable information can be determined for the user, or an user's geographic location may be generalized where location information is obtained (such as to a city, ZIP code, or state level), so that a particular location of a user cannot be determined. Thus, the user may have control over how information is collected about the user and used by the content sharing platform.

In one embodiment, a playlist (e.g., Playlist 1) that has been generated for the user may be removed and/or deleted if the user does not view media items from the playlist and/or does not access the playlist for a threshold period of time. For example, if the user does not view any of the media items in Playlist 1 for a threshold period of time (e.g., one day, five days, one week, three weeks, two months, etc.), the content sharing platform may remove and/or delete Playlist 1. In another embodiment, the content sharing platform may modify the playlist. For example, if one or more media items included in Playlist 1 have not been consumed by the user, the content sharing platform may remove the one or more media items from Playlist 1. In another example, the content sharing platform may also add new media items to Playlist 1 based on additional social interactions and/or actions associated with media items, performed by the user.

The activity feed 150 can include information about activities associated with channels to which the user is subscribed. In one embodiment, the activity feed 150 can include information about the most recent activities (e.g., activity items) associated with each channel (e.g., media items uploaded to the channel, etc.), as well as a mechanism for the user to perform an action for that activity (e.g., providing a frame, image, and/or icon of the digital content uploaded to the channel that serves as a link to the digital content). If the user uses the activity feed 150 to perform an action, that action can be associated with the channel which performed the activity. In one embodiment, the activity feed 150 may be a combined activity feed that includes activities associated with multiple channels that the user is subscribed to. In one embodiment (not shown in the figures), an activity item may be displayed in the activity feed 150 when the content sharing platform generates a playlist and/or modifies a playlist. For example, when the content sharing platform generates Playlist 1, the content sharing platform may create a new activity item in the activity feed 150 indicating that Playlist 1 has been generated. In another example, when the content sharing platform modifies Playlist 1, the content sharing platform may create a new activity item in the activity feed 150 indicating that Playlist 1 has been modified.

As illustrated in FIG. 1, the activity feed 150 includes activity items 160, 165, and 170. Each media item may include information about the activity, the title of a media item, a description of the media item, and an icon for the media item. For example, the activity item 160 includes information that "Channel A uploaded a video," includes the title of the video (e.g., Cool Video), a description of the video (e.g., "This is a cool video"), and an icon 161. An icon (e.g., icon 166 or icon 126) may be text, a thumbnail, an image, a frame, and/or some other graphic used to represent the media item for the activity item 160. Icons 161, 166, and 171 are used to represent the media items (e.g., videos) associated with activity items 160, 165, and 170 respectively. Although a list of videos are shown as being included in the activity feed 150, it should be understood that in other embodiments, other activity feed information may be shown in the GUI 100. For example, an image (e.g., a JPEG) may be shown in the GUI 100. In another example, digital music (e.g., an MP3) may be played in the GUI 100. In yet another example, social media information (e.g., a tweet, a like, etc.) may be shown in the GUI 100.

In one embodiment, the GUI 100 may receive user input that may include social interactions between the user and one or more entities and/or actions performed by the first user. For example, the GUI 100 may receive user input such as a post, a comment, or a "like" of another entity's post. In another example, the GUI 100 may receive user input associated with one or more media items and/or channels (e.g., the GUI 100 may receive user input indicating that the user "likes" a video or is subscribing to a channel). The GUI 100 may provide this user input to the content sharing platform and the content sharing may identify a subset of the media items in the content sharing platform. The GUI 100 may receive a playlist (from the content sharing platform) that identifies the subset of the plurality of media items that were identified based on at least one of the social interactions between the first user and one or more entities or the actions performed by the first user. For example, the playlist may include identifiers and/or links to media items. The GUI 100 may present the playlist to the user so that the user may consume one or more media items from the playlist.

Figure 2:
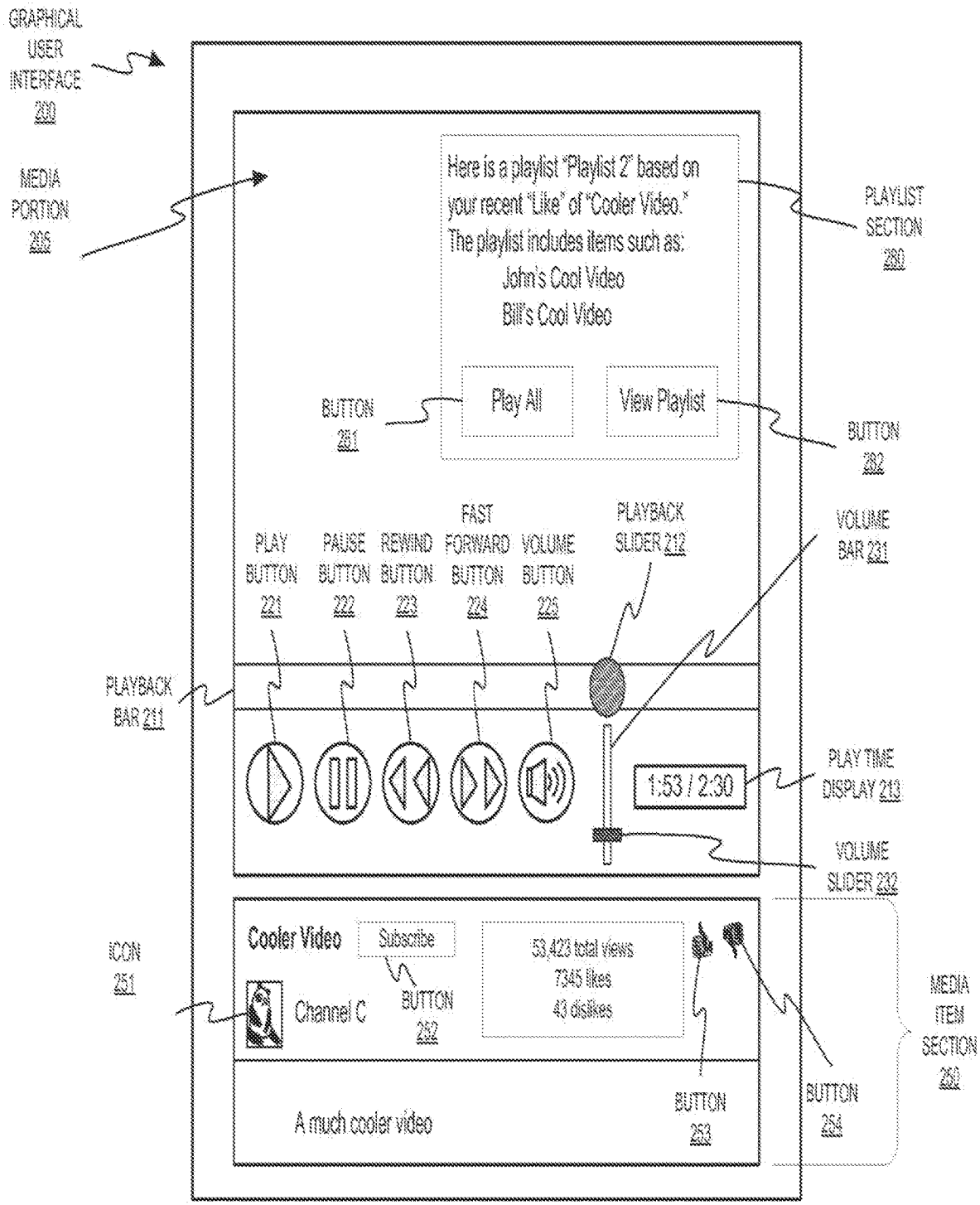
FIG. 2 is a diagram illustrating an example graphical user interface (GUI), in accordance with another embodiment of the present disclosure.

FIG. 2 is a diagram illustrating an example graphical user interface (GUI) 200 in accordance with one embodiment of the present disclosure. In one embodiment, the GUI 200 may be part of a media viewer provided by a server (e.g., server 330 as illustrated and discussed below in conjunction with FIG. 3). For example, the GUI 200 may be part of a media viewer that is embedded in a web page (e.g., an embedded media viewer such as a Flash® player or a hypertext markup language-5 (HTML5)-based player) and the GUI 200 may be rendered by a web browser executing on a client device. In another embodiment, the GUI 200 may be part of a media viewer that may be separate from a web page/web browser (e.g., may be a standalone media viewer and/or application). For example, the media viewer may be a separate application (e.g., an app) that is executing on the client device. Referring back to FIG. 1, the GUI 200 may be displayed to the user when the user selects activity item 170 from the activity feed 150 (e.g., when the user selects the video titled "Cooler Video" that was uploaded by channel C).

The GUI 200 includes media viewer controls which may be used to control the consumption of the media items (e.g., digital videos and/or digital music). The media viewer controls include a play button 221, a pause button 222, a rewind button 223, a fast forward button 224, and a volume button 225. The play button 221 may allow a user to begin and/or restart playback of the media items. The pause button may allow a user to pause and/or un-pause playback of the media items. The rewind button 223 may allow a user to rewind playback, move and/or skip to an earlier point in time in the media items. The fast forward button 224 may allow a user to fast forward playback, move, and/or skip to a later point in time in the media items. The GUI 200 also includes a play time display 213, a playback bar 211 and a playback slider 212. The play time display 213 may display a current play time and/or a total play time for the media items. For example, a total play time (e.g., the total length) of media item may be 2 minutes and 30 seconds (e.g., 2:30). The current play time may be current time/position in the playback of media item (e.g., 1 minute and 53 seconds or 1:53). Playback slider 212 is positioned on a region of a playback bar 211 that corresponds to the current play time (e.g., 1:53). The playback slider 212 may be adjusted (e.g., dragged) to any other region of the playback bar 211 to adjust the current play time shown in the play time display 213. The GUI 200 includes a media portion 205 that may display a media item. For example, media portion 205 may be the portion of the GUI 200 where a video (e.g., a media item) is played. The media portion 205 may also play other types of videos, images, music, and/or other media items.

The volume button 225 may allow user to control the volume of sounds, music, and/or other audible noises in the videos. In one embodiment, the volume bar 231 and the volume slider 232 may be displayed when the user clicks and/or activates the volume button 225. For example, the volume bar 231 and the volume slider 232 may not be initially displayed in the GUI 200. After the user clicks the volume button 225, the volume bar 231 and the volume slider 232 may be displayed. The user may move and/or slide the volume slider 232 up and/or down along the volume bar 231 to control the volume of sounds, music, and/or other audible noises in the videos. For example, the user may slide the volume slider 232 up to increase the volume or may slide volume slider 232 down to decrease the volume. In one embodiment (not shown in the figures), the GUI 200 may also include buttons (e.g., magnifying glass buttons) that allow a user to zoom in and/or zoom out during the consumption of media items. This may allow a user to get a closer view and/or a farther view of the media item.

The GUI 200 also includes media item section 250. The media item section 250 may include information such as the title, a description, number of approvals from other users (e.g. "likes"), number of dislikes, the channel that the media item belongs to, and total number of views for the media item. Referring back to FIG. 1, the media item section 250 includes information about the video titled "Cooler Video" such as the title, the description (e.g., "A much cooler video"), the channel that the video belongs to (e.g., Channel C), and the number of views (e.g., 53,423), likes (e.g., 7345), and dislikes (e.g., 43) for the video. The media item section 250 also includes an icon 251 that may be used to represent the channel C.

The media item section 250 further includes buttons 252, 253, and 254. Button 252 may allow a user to subscribe to the channel that includes the media item presented in the media portion 205. For example, the button 252 may be used to subscribe to the channel C that includes the video titled "Cooler Video" that is playing in the media portion 205. The button 253 may allow a user to indicate that the user approves of or likes the media item that is playing in the media portion 205. For example, the button 253 may be used to approve of or "like" the video titled "Cooler Video" that is playing in the media portion 205. The button 254 may allow a user to indicate that the user does not like the media item that is playing in the media portion 205. For example, the button 254 may be used to "dislike" the video titled "Cooler Video" that is playing in the media portion 205.

As discussed above, the content sharing platform may identify media items to include in a playlist for the user when the user indicates approval of a first media item (e.g., when the user selects or activates the button 253). For example, the content sharing platform may identify other media items that belong to the entity that uploaded or provided the first media item (e.g., other media items in Channel C). The content sharing platform may also identify media items to include in the playlist for the user when the user subscribes to a channel. For example, the content sharing platform may identify other media items that are associated with the channel that the user has subscribed to.

The GUI 200 also includes a playlist section 280 that includes information associated with a playlist for the user generated by the content platform. In one embodiment, the playlist may be generated for the user based on the user's social interactions between one or more entities and/or based on the user's actions associated with one or more media items of the content sharing platform. In another embodiment, the playlist may be generated for the user based on the user's action associated with one or more media items and/or channels (e.g., subscribing to a channel, indicating an approval of a media item, etc.). The playlist section 280 includes information (e.g., text) indicating that a playlist titled "Playlist 2" has been generated for the user based on the user's approval (e.g., "like" of "Cooler Video"). The playlist section 280 also includes information (e.g., text) indicating one or more of the media items (e.g., videos, music, etc.) that may be included in Playlist 2. In other embodiments, the playlist section 280 may include additional information (e.g., titles, descriptions, images, icons, and graphics) to represent the playlist and/or one or more media items included in the playlist. In other embodiments, more or less information (e.g., text, images, icons, graphics, etc.) may be included in the playlist section 280. The playlist section 280 also includes button 281 and button 282. When a user activates (e.g., clicks, selects, etc.) button 281, a media player (as discussed below in conjunction with FIG. 2) may begin playback of the media items included in Playlist 2. The button 282 may allow user to view the media items that are included in Playlist 2.

In one embodiment, the GUI 200 may receive user input that may include social interactions between the user and one or more entities and/or actions performed by the user. For example, the GUI 200 may receive user input such as a post on an entity's wall or feed. In another example, the GUI 200 may receive user input indicating that the user "likes" a video or is subscribing to a channel. The GUI 200 may provide this user input to the content sharing platform and the content sharing may identify a subset of the media items in the content sharing platform based on the user input. The GUI 200 may receive a playlist (from the content sharing platform) that identifies the subset of the plurality of media items that were identified based on at least one of the social interactions between the first user and one or more entities or the actions performed by the first user. For example, the playlist may include identifiers and/or links to media items. The GUI 200 may present the playlist to the user so that the user may consume one or more media items from the playlist.

FIG. 3 illustrates an example system architecture 300, in accordance with one embodiment of the present disclosure. The system architecture 300 includes client devices 310A through 310Z, a network 305, a data store 306, a content sharing platform 320, a server 330, a social connection platform 340, an email platform 350, and a search platform 360. In one embodiment, network 305 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one embodiment, the data store 310 may be may be a memory (e.g., random access memory), a cache, a drive (e.g., a hard drive), a flash drive, a database system, or another type of component or device capable of storing data. The data store 310 may also include multiple storage components (e.g., multiple drives or multiple databases) that may also span multiple computing devices (e.g., multiple server computers).

The client devices 310A through 310Z may each include computing devices such as personal computers (PCs), laptops, mobile phones, smart phones, tablet computers, netbook computers etc. Each client device includes a media viewer 311. In one embodiment, the media viewers 311 may be applications that allow users to view content, such as images, videos, web pages, documents, etc. For example, the media viewer 311 may be a web browser that can access, retrieve, present, and/or navigate content (e.g., web pages such as Hyper Text Markup Language (HTML) pages, digital media items, etc.) served by a web server. The media viewer 311 may render, display, and/or present the content (e.g., a web page, a media viewer) to a user. The media viewer 311 may also display an embedded media player (e.g., a Flash® player or an HTML5 player) that is embedded in a web page (e.g., a web page that may provide information about a product sold by an online merchant). In another example, the media viewers 311 may be a stand-alone application that allows users to view digital media items (e.g., digital videos, digital images, electronic books, etc.). The media viewers 311 may be provided to the client devices 310A through 310Z by the server 330 and/or content sharing platform 320. For example, the media viewers 311 may be embedded media players that are embedded in web pages provided by the content sharing platform 320. In another example, the media viewers 311 may be applications that are downloaded from the server 330.

In one embodiment, the content sharing platform 320 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 320 may allow a user to consumer, upload, search for, approve of (e.g., "like"), dislike, and/or comment on media items. The content sharing platform 320 may also include a website (e.g., a webpage) that may be used to provide a user with access to the media items. The content sharing platform 320 includes multiple channels (e.g., channels A through Z). Each channel may include one or more media items 321. Examples of a media item can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A media item may be consumed via the Internet and/or via a mobile device application. For brevity and simplicity, an online video (also hereinafter referred to as a video) is used as an example of a media item throughout this document. As used herein, "media," "media item," "online media item," "digital media," and a "digital media item" can include an electronic file that can be executed or loaded using software, firmware or hardware configured to present the digital media item to an entity. In one embodiment, the content sharing platform 320 may store the media items using the data store 306.

Social connection platform 340 may be one or more computing devices (e.g., servers), data stores, networks, software components, and/or hardware components that may be used to allow users to connect to, share information, and/or interact with each other. A social connection platform 340 may present to a user a listing (e.g., activity feed, feed, stream, wall, etc.) of objects (such as posts, content such as videos, images, audio, etc., status updates, favorability indications, tags, messages, and so on) generated by other users of the social connection platform 340. The social connection platform 340 may also include a content sharing aspect that allow users to upload, view, tag, and share content, such as text content, video content, image content, audio content, and so on. Other users of the social connection platform 340 may comment on the shared content, discover new content, locate updates, share content, and otherwise interact with the provided content. In one embodiment, the content sharing platform 320 may be integrated with the social connection platform 340. For example, the social connection platform 340 may use the content sharing platform 320 to allow users to upload and/or share content. In another embodiment, the social connection platform 340 may be separate from the content sharing platform 320. In one embodiment, the social connection platform 340 may also include chat functionality (e.g., a chat platform) to allow users to chat (e.g., to instant message) each other.

In one embodiment, email platform 350 may be one or more computing devices (e.g., servers), data stores, networks, software components, and/or hardware components that may be used to allow users to send and/or receive electronic-mail (emails) to each other. For example, a first user may use the email platform 350 to send an email to a second user regarding the time and location of a particular event. The first user may also attached files (e.g., video files, image files, text files, etc.) to the email. In one embodiment, the email platform 350 may also include chat functionality (e.g., a chat platform) to allow users to chat (e.g., to instant message) each other. In another embodiment, the search platform 360 may be one or more computing devices, data stores, networks, software components, and/or hardware components that may be used to allow users to search for information and/or data. For example, the search platform 360 may allow a user to search the Internet and/or other networks for articles, blogs, websites, webpages, images, videos, and/or other content related to a particular topic (e.g., how to fix a car). The search platform 360 may also include a search engine.

In one embodiment, the server 330 may be one or more computing devices (e.g., a rackmount server, a server computer, etc.). In one embodiment, the server 330 may be included in one or more of the content sharing platform 320, the social connection platform 340, the email platform 350, and the search platform 360. In another embodiment, the server 330 may be separate from the content sharing platform 320, the social connection platform 340, the email platform 350, and the search platform 360 but may communicate (e.g., exchange data with) the content sharing platform 320, the social connection platform 340, the email platform 350, and the search platform 360. The server 330 includes a playlist module 335. The playlist module 335 may generate playlists for a user based on the user's social interactions with other entities (e.g., other users of the content sharing platform 320, the social connection platform 340, and/or the email platform 350). This may allow the user to more easily find media items to consume (e.g., to view).

In one embodiment, the playlist module 335 may generate playlists for the user by analyzing interactions between the user and other entities (e.g., users of one or more of the content sharing platform 320, the social connection platform 340, the email platform 350, and the search platform 360). For example, the playlist module 335 may obtain (e.g., may determine or calculate) an affinity score between two users of the content sharing platform. In one embodiment, an affinity score may be an indication of a level of connection between two users of the different platforms (e.g., the content sharing platform 320, the social connection platform 340, and the email platform 350). For example, an affinity score may be calculated by analyzing explicit actions that a user takes such as clicking, liking, providing positive feedback, commenting, tagging (e.g., assigning an identifier to a piece of information), sharing, friending (requesting to be a friend), etc.), and by factoring in the strength of the action, how "connected" the user who took the action was to an entity (e.g., how many mutual connections the user and the entity share share, etc.), and how long ago the action was taken or performed. In addition, other factors such as mode of communication, frequency of communications, and so on, may be taken into consideration for determining an affinity score. Note that an affinity score may be a one-way score (e.g., not reciprocal). For example, a first user's affinity score for an entity (e.g., for a second user) is not necessarily the same as the entity's affinity score for the first user. The affinity score may be any number, text, and/or value that may be used to indicate the level of connection between the user and the entity. For example, the affinity score may be a numerical value from 0 to 1 (e.g., 0.8) where a value of 0 indicates no connection between the user and the entity and a value of 1 indicates a very high level of connection between the user and the entity. In another example, the affinity score may be a numerical value from 1 to 10, or 1 to 100, where a higher number indicates a higher level of connection between the user and the entity.

The playlist module 335 may obtain affinity scores for the user and one or more entities by analyzing interactions between the user and the one or more entities. The playlist module 335 may identify entities with which the user has higher affinity scores (e.g., may identify which of the other entities the user interacts more with) and may generate a playlist for the user based on the one or more entities. For example, the playlist module 335 may identify channels that belong to the one or more entities and/or media items that are associated with the one or more entities. In another example, the playlist module 335 may identify channels and/or media items that the one or more entities are subscribed to and/or have accessed. The playlist module 335 may generate a playlist for the user based on these channels and/or media items.

The playlist module 335 may communicate with one or more of the content sharing platform 320, the social connection platform 340, the email platform 350, and the search platform 360 and may collect account information, personal information, and/or demographic information pertaining to groups of users (e.g., age of user groups, geography (e.g., country, state, city) of user groups) and may store the information in one or more data stores (e.g., hard disks, memories, databases, etc.). In situations in which the embodiments discussed herein collect personal information and/or demographic about users, or may make use of personal information and/or demographic information, the user may be provided with an opportunity to control whether the playlist module 335 is allowed to collect the information (e.g., information about a user's social network, social actions or activities, profession, a user's preferences, or a user's current location), or to control whether and/or how to receive content from the content sharing platform that may be more relevant to the user. In addition, certain data may be treated in one or more ways before it is stored or used, so that personally identifiable information is removed. Thus, the user may have control over how, when, and what type of information is collected about the user and used by the playlist module 335.

In one embodiment, the playlist module 335 may generate a playlist for a user by analyzing the content of the interactions between the user and other entities (e.g., other users of the content sharing platform 320, the social connection platform 340, and/or the email platform 350) For example, the playlist module 335 may analyze the subject matter of user interactions such as emails, chat messages (e.g., instant messages), text messages, short message service (SMS) messages, multimedia message service (MMS) messages, posts on walls of the social connection platform 340, etc. The playlist module 335 may generate playlists based on the subject matter of the user inactions. For example, the user and another entity (e.g., a user of the social connection platform 340) may exchange chat messages discussing a football game that recently occurred. The playlist module 335 may identify media items related to football, related to certain football teams, and/or related to a content provider (e.g., a sports channel on television) based on the chat messages. The playlist module 335 may use any combination of algorithms, functions, operations, actions, etc., to analyze user interactions and identify media items that may be of interest to the user and to generated the playlist based on the identified media items.

In one embodiment, the playlist module 335 may analyze a list and/or a history of media items viewed by the user to identify media items to include in the playlists for the first user. For example, the playlist module 335 may determine that a first user has viewed a certain number of videos from a channel (e.g., has viewed five, fifteen, etc., videos from a channel). The playlist module 335 may identify other media items in the channel and may generate a playlist that includes the other media items.

In another embodiment, the playlist module 335 may generate a playlist based on user input provided by the user. For example, the user may voluntarily provide input indicating the user's interests, likes, hobbies, employment, geographical location, personal information, and/or other demographic information. The playlist module 335 may identify media items that may be of interest to the user based on the personal information and/or other demographic information voluntarily provided by the user and may generate a playlist that includes the identified media items. For example, a user may provide user input indicating that the user likes action movies when the user creates an account for the social connection platform 340. The playlist module 335 may identify media items related to action movies, based on the user input. In another example, a user may provide user input indicating that the user likes fishing when the user creates and account for the content sharing network 320. The playlist module 335 may identify channels related to fishing based on the user input.

In one embodiment, the playlist module 335 may generate one or more playlists for the user and may add the one or more playlists to an activity feed for the user (e.g., activity feed 150 illustrated in FIG. 1). The activity feed may allow the user to quickly determine when new playlists are generated by the playlist module 335 and to access the playlist. This allows the user to find new and/or interesting media items to consume (e.g., play or view) more easily.

In one embodiment, the playlist module 335 may delete a playlist that has been generated for the user if the user does not access the playlist (e.g., does not select the playlist) and/or does not consume media items that are included in the playlist, within a threshold period of time. For example, if the user does not access a playlist for more than five days, the playlist module 335 may deleted the playlist. In another embodiment, the playlist module 335 may modify a playlist that has been generated for the user if the user does not consume media items that are including in the playlist within a threshold period of time. For example, if the user does not consume a media item in the playlist within two weeks, the media item may be removed from the playlist. In a further embodiment, the playlist module 335 may update the playlist based on additional social interactions and/or actions performed by the user. For example, as the user subscribes to additional channels or indicates approval (e.g., likes) additional media items, the playlist module 335 may identify additional media items and may include the additional media items in the playlist.

Figure 4:
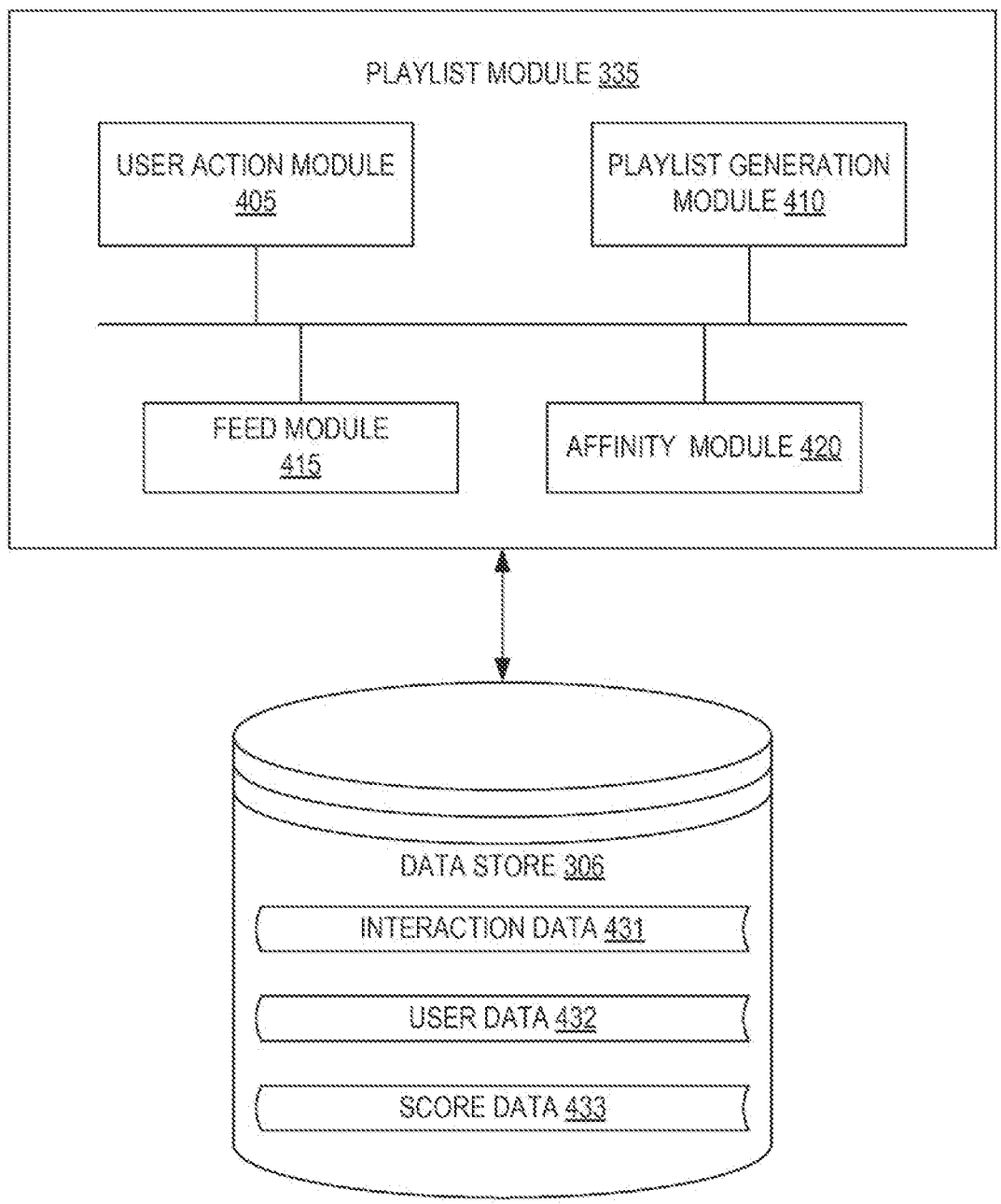
FIG. 4 is a block diagram illustrating a playlist module, in accordance with one embodiment of the present disclosure.

FIG. 4 is a block diagram illustrating a playlist module 335, in accordance with one embodiment of the present disclosure. The playlist module 335 includes a user action module 405, a playlist generation module 410, a feed module 415, and an affinity module 420. More or less components may be included in the playlist module 335 without loss of generality. For example, two of the modules may be combined into a single module, or one of the modules may be divided into two or more modules. In one embodiment, one or more of the modules may reside on different computing devices (e.g., different server computers). The playlist module 335 a user action module 405, a playlist generation module 410, a feed module 415, and an affinity module 420 may each be processing logic that comprises hardware (e.g., circuitry, dedicated logic, programmable logic, microcode, etc.), software (e.g., instructions run on a processor to perform hardware simulation), or a combination thereof.

The playlist module 335 is communicatively coupled to the data store 306. For example, the playlist module 335 may be coupled to the data store 306 via a network (e.g., via network 305 as illustrated in FIG. 3). In another example, the data store 306 may be coupled directly to a server where the playlist module 335 resides (e.g., may be directly coupled to server 330). The data store 306 may be a memory (e.g., random access memory), a cache, a drive (e.g., a hard drive), a flash drive, a database system, or another type of component or device capable of storing data. The data store 306 may also include multiple storage components (e.g., multiple drives or multiple databases) that may also span multiple computing devices (e.g., multiple server computers). The data store 306 includes interaction data 431, user data 432, and score data 433.

In one embodiment, the user action module 405 may identify and/or monitor one or more social interactions and/or actions associated with media items, perform by a user. For example, the user action module 405 may monitor when a user posts a comments onto a wall or a feed of another entity (e.g., another user of a social connection platform). In another example, the user action module may identify when a user adds another entity (e.g., another user of a social connection platform) as a social connection (e.g., when the user "follows" and entity and/or adds the entity as a friend on a social connection platform). The user action module 405 may also identify and/or monitor actions that are associated with media items and/or channels that are performed by the user. For example, the user action module 405 may monitor when a user indicates approval of a media item (e.g., "likes" a media item). In another example, the user action module may monitor when a user subscribes to a channel. The user action module 405 may store data indicative of the user's actions that are associated with media items and/or channels in the user data 432 of the data store 306.

In one embodiment, the affinity module 420 may obtain (e.g., calculate and/or generate) affinity scores for different users. For example, the affinity module 420 may obtain (e.g., may determine or calculate) an affinity score between a user and an entity (e.g., another user of a content sharing platform or a social connection platform). The affinity module 420 may obtain the affinity score by looking at explicit actions that users take (e.g., clicking, liking, commenting, tagging), and by factoring in the strength of the action, how "connected" the user who took the action was to the target entity and how long ago they took the action. In addition, other factors such as mode of communication, frequency of communications, and so on, may be taken into consideration for determining an affinity score. The interaction data 431 may include data, information, and/or records of interactions between users and other entities obtained from different platforms (e.g., a social connection platform, an email platform, a chat platform, etc.). For example, the interaction data 431 may include data such as emails, posts, chat messages, etc., between different a user and an entity (e.g., another user of the content sharing platform and/or the social connection platform). The affinity module 420 may obtain the affinity scores by analyzing the interaction data 431 and/or the user data 432. In one embodiment, the affinity module 420 may store the affinity scores in the score data 433 of the data store 306.

In one embodiment, the playlist generation module 410 may generate one or more playlists for users based on their social interactions with other entities and/or actions that are associated with media items and/or channels of a content sharing platform. For example, the playlist generation module 410 may identify other entities with which a user has an affinity score over a certain threshold or may identify the users with which the user has the highest affinity scores (e.g., the top ten affinity scores). The playlist generation module 410 may identify channels and/or media items that belong to the identified entities, channels the identified entities are subscribed to, and/or channels and/or media items that have been accessed by the identified entities. The playlist generation module 410 may generate a playlist based on the identified channels and/or media items. In another embodiment, the playlist generation module 410 may identify media items to include in a playlist for a user based on the content of a user's interactions with other users. For example, the playlist generation module 410 may identify media items based on the subject matter of emails and/or chat messages between different users, stored in the interaction data 431. In a further embodiment, the playlist generation module 410 may analyze history and/or list of media items viewed by a user to identify media items to include in a playlist for a user.

In one embodiment, the playlist generation module 410 may delete a playlist and/or may delete media items from a playlist that has generated for a user. For example, if a playlist has not been accessed and/or viewed by a user for a threshold period of time (e.g., one day, seven days, one week, etc.), the playlist generation module 410 may delete the playlist. In another example, if one or more media items included in a playlist have not been accessed and/or consumed by a user for a threshold period of time, the playlist generation module 410 may remove the one or more items from the playlist. In another embodiment, the playlist generation module 410 may also generate a new playlist and/or update a playlist with new media items based on additional social interactions and/or actions that are associated with media items, performed by a user. For example, if a user indicates approval of a new media item (e.g., likes a new video), the playlist generation module 410 may identify new media items to add to a playlist based on the user's actions. In another example, if the user subscribes to a new channel, the playlist generation module 410 may generate a new playlist based on the user's subscription to the new channel. The playlist generation module 410 may store the playlists that are generated for the user as part of the user data 432 stored in the data store 306.

In one embodiment, the playlist generation module 410 may communicate with different platforms (e.g., a content sharing platform, a social connection platform, an email platform, etc.) and may collect account information, personal information, and/or demographic information pertaining to groups of users and may store the information in user data 432. The user action module 405 may generate playlists based on the user data 432, as discussed above in conjunction with FIG. 3. In situations in which the embodiments discussed herein collect personal information and/or demographic about users, or may make use of personal information and/or demographic information, the user may be provided with an opportunity to control whether the playlist module 335 is allowed collect the information, or to control whether and/or how to receive content from the content sharing platform that may be more relevant to the user. In addition, certain data may be treated in one or more ways before it is stored or used, so that personally identifiable information is removed. Thus, the user may have control over how, when, and what type of information is collected about the user and used by the playlist module 335.

In one embodiment, the feed module 415 may add one or more playlists generated for a user to an activity feed for the user (e.g., activity feed 150 illustrated in FIG. 1). In another embodiment, the feed module 415 may remove playlists from the activity feed if the playlist is deleted. For example, if the playlist is deleted because the user does not access the playlist and/or consume media items in the playlist for a threshold period of time, the feed module 415 may remove the playlist from the activity feed of the user.

Figure 5:
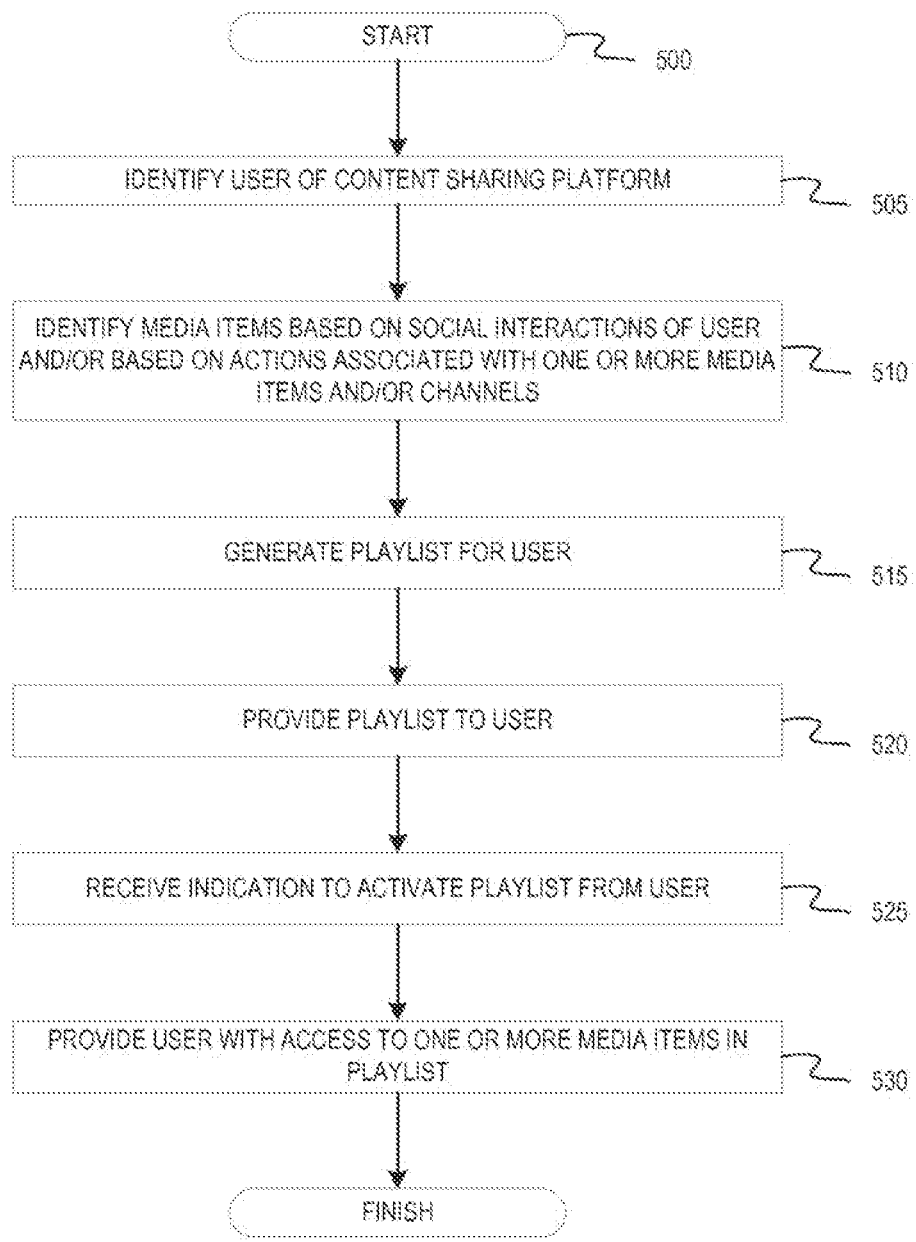
FIG. 5 is a flow diagram illustrating a method of generating a playlist for a user, in accordance with one embodiment of the present disclosure.
Figure 6:
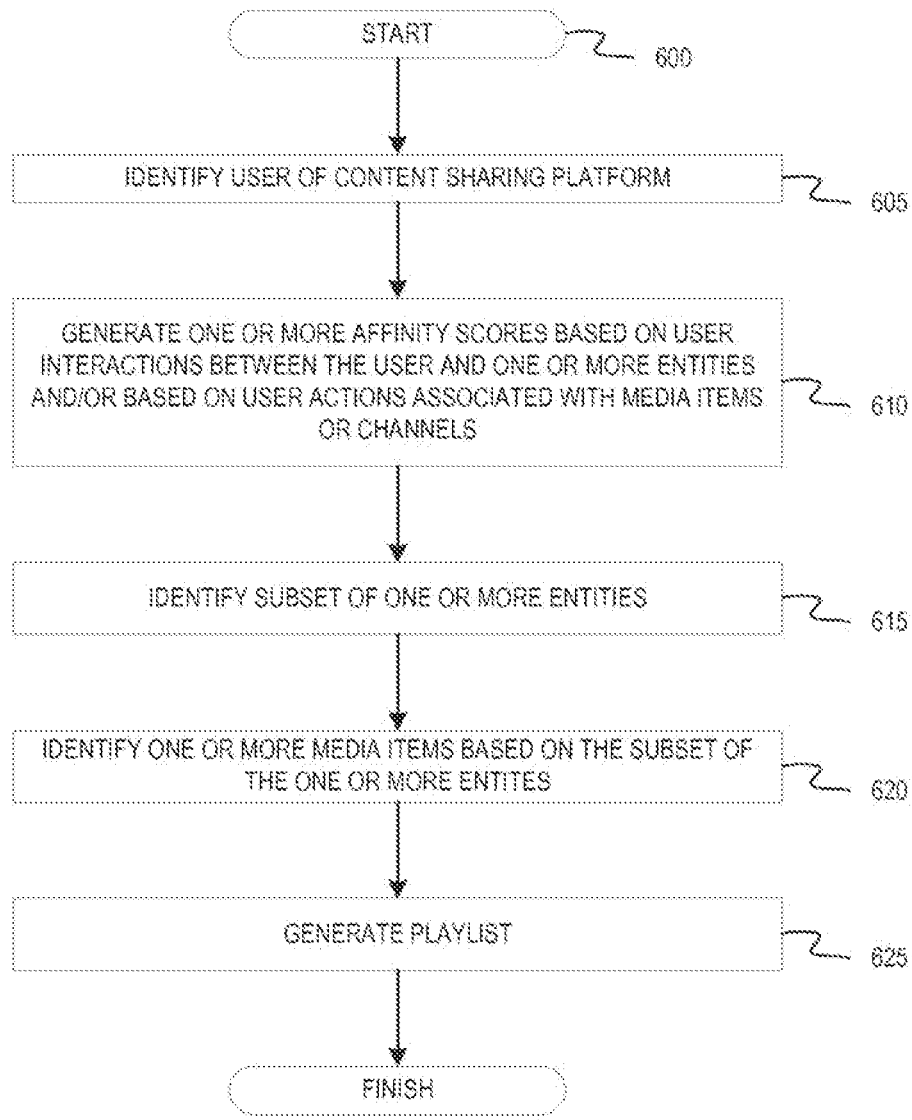
FIG. 6 is a flow diagram illustrating a method of generating a playlist for a user, in accordance with another embodiment of the present disclosure.
Figure 7:
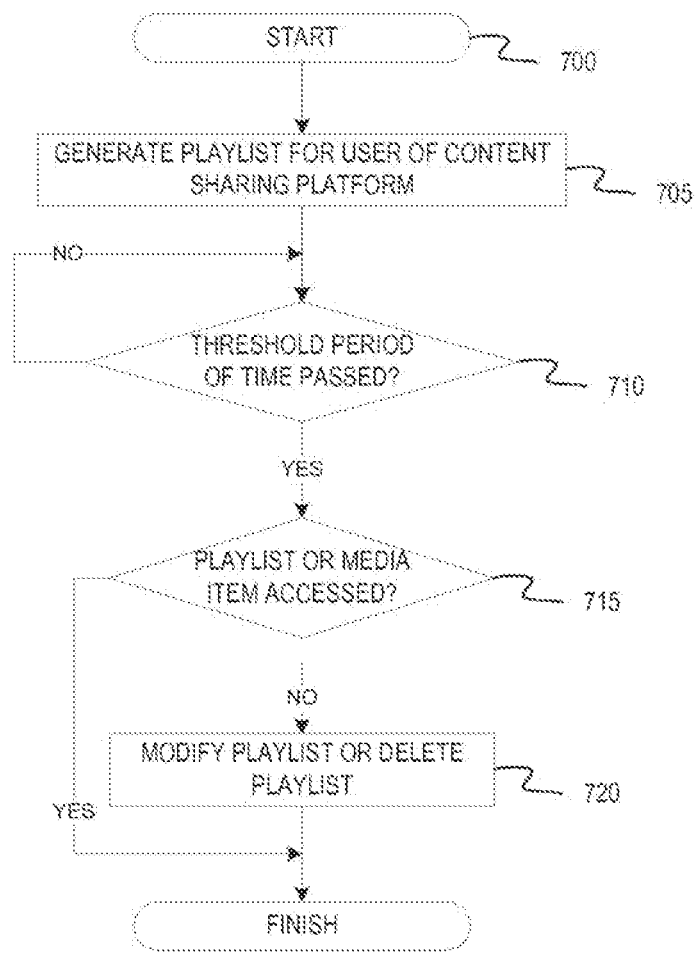
FIG. 7 is a flow diagram illustrating a method of modifying a playlist for a user, in accordance with one embodiment of the present disclosure.

FIGS. 5-7 are flow diagrams illustrating methods of generating and/or modifying playlists. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 5 is a flow diagram illustrating a method 500 of generating a playlist for a user of a content sharing platform, in accordance with one embodiment of the present disclosure. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by a playlist module, as illustrated in FIGS. 3 and 4.

Referring to FIG. 5 the method 500 begins at block 505 where the processing logic identifies a user of a content sharing platform. For example, the processing logic may identify a user when the user logs into the content sharing platform, when the user performs a social interaction (e.g., posts a comment on an entity's wall, indicates an approval of an item in an entity's activity feed, etc.), and/or when the user performs an action that is associated with media items and/or channels (e.g., "likes" a media item, subscribes to a channel, etc.). At block 510, the processing logic identifies media items based on social interactions of the user and/or actions of the user that are associated with media items and/or channels. For example, the user may indicate approval of (e.g., "like") a first media item. The processing logic may identify other media items that belong to the entity that uploaded the first media item to the content sharing platform. In another example, the user may create a social connection with an entity (e.g., "friend" an entity or add the entity as a friend). The processing logic may identify media items in the content sharing platform that belong to the entity.

The processing logic generates a playlist for the user based on the media items that are identified based on the users social interactions and/or actions associated with media items and/or channels (block 515). At block 520, the playlist is provided to the user. For example, the user may be presented with information indicating that a playlist has been generated for the user and the user may be presented with options to access and/or play the playlist (as illustrated in FIGS. 1 and 2). The user may also be presented with information indicating one or more reasons why the playlist has been generated for the user (e.g., the playlist has been generated because the user "liked" a media item, added an entity as a friend or social connection, subscribed to a channel, etc.). The processing logic may receive an indication to activate the playlist from the user at block 525. For example, referring to FIG. 1, the user may activate button 181 to consume (e.g., play) media items in the playlist. At block 530, the processing logic provides the user with access to one or more media items in the playlist. For example, the processing logic may allow the user to consume (e.g., play) a media item in the playlist.

FIG. 6 is a flow diagram illustrating a method 600 of generating a playlist for a user, in accordance with another embodiment of the present disclosure. The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by a playlist module, as illustrated in FIGS. 3 and 4.

Referring to FIG. 6, the method 600 begins at block 605 where the processing logic identifies a user of a content sharing platform (e.g., when the user logs into the content sharing platform, when the user performs a social interaction, and/or when the user performs an action that is associated with media items and/or channels). At block 610, the processing logic generates one or more affinity scores based on user interactions between the user and one or more entities and/or based on user actions associated with media items or channels. For example, the processing logic may generate an affinity score based on a user's social interactions (e.g., comments, likes, posts, etc.) with a user of a social connection platform (e.g., an entity). In another example, the processing logic may generate an affinity score based on a user's indications of approval of different media items (e.g., "likes") and/or subscriptions to different channels.

The processing logic identifies a subset of the one or more entities based on the affinity scores (block 615). For example, the processing logic may identify affinity scores that are above a threshold value and may identify the entities associated with the affinity scores that are above a threshold value. At block 620, the processing logic identifies one or more media items to include in a playlist for the user, based on the subset of the one or more entities. For example, the processing logic may identify media items that belong to an entity in the subset of entities and/or may identify media items consumed by the entity. At block 625, the processing logic generates the playlist based on the media items identified at block 620.

FIG. 7 is a flow diagram illustrating a method 700 of modifying a playlist for a user, in accordance with one embodiment of the present disclosure. The method 700 may be performed by processing logic that comprises hardware (e.g., circuitry, dedicated logic, programmable logic, microcode, etc.), software (e.g., instructions run on a processor to perform hardware simulation), or a combination thereof. In one embodiment, method 700 may be performed by a playlist module, as illustrated in FIGS. 3 and 4.

Referring to FIG. 7, the method 700 begins at block 705 the processing logic generates a playlist for a user of a content sharing platform. For example, the processing logic may generate a playlist as described above in conjunction with FIGS. 1-6. At block 710, the processing logic determines whether a threshold period of time has passed (e.g., determines whether one week has passed, three days has passed, etc.) If the threshold period of time has not passed, the processing logic proceeds to block 710. If the threshold period of time has passed, the processing logic proceeds to block 715. It should be understood that in other embodiments, any threshold period of time (e.g., seconds, minutes, hours, days, weeks, years, etc.) may be used. At block 715, the processing logic determines whether the playlist and/or media items in the playlist were accessed and/or consumed by the user. For example, the processing logic may determine whether the user as viewed the playlist and/or has consumed one or more media items in the playlist. If the user has accessed the playlist and/or consumed a media item in the playlist, the method 700 ends. If the user has not accessed the playlist and/or consumed a media item in the playlist, the processing logic proceeds to block 720, where the processing logic may modify the playlist or delete the playlist. For example, the processing logic may remove a media item that has not been consumed within a threshold period of time, from the playlist. In another example, the processing logic may delete a playlist that has not been accessed for a threshold period of time. After block 720, the method 700 ends.

Figure 8:
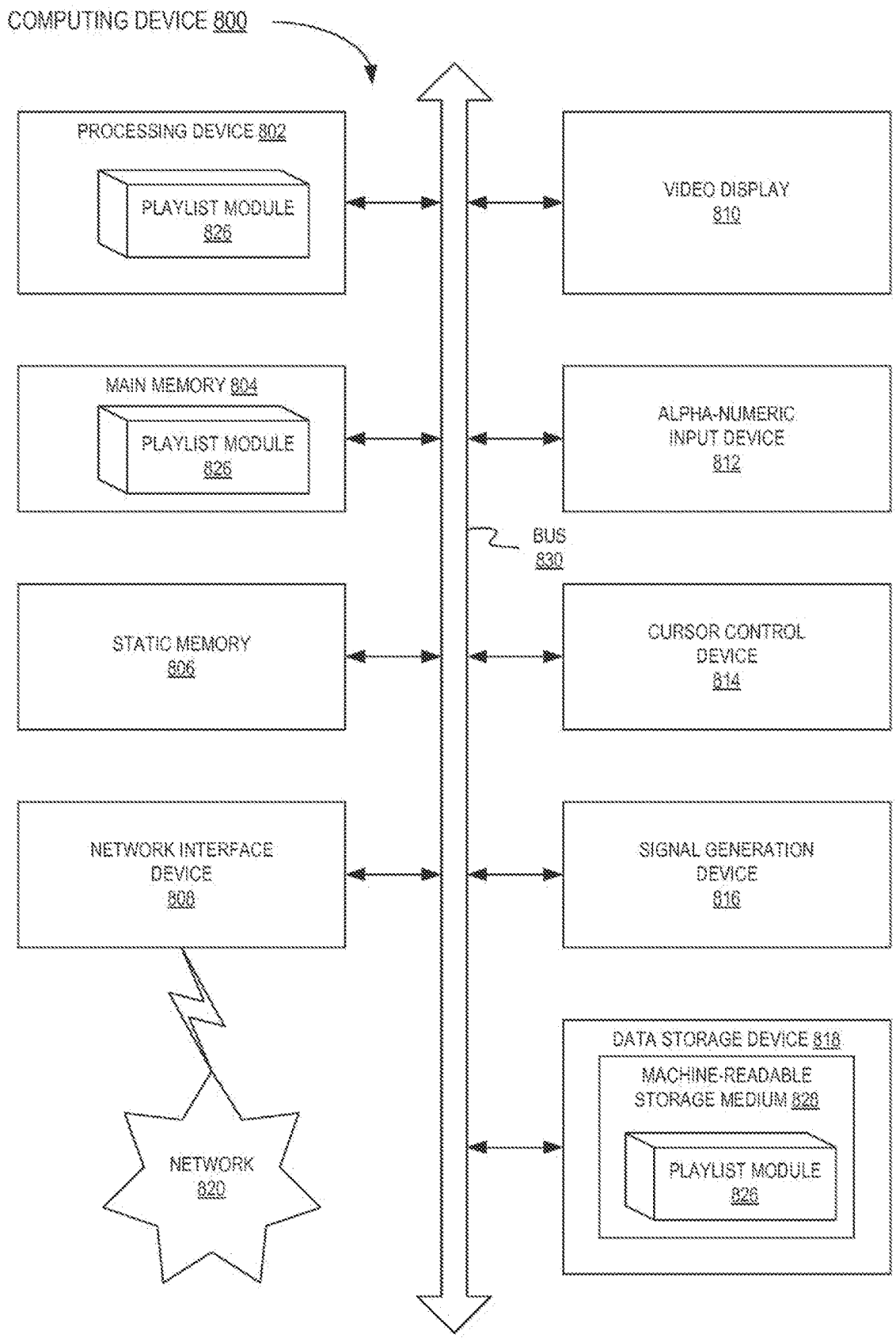
FIG. 8 is a block diagram of an example computing device that may perform one or more of the operations described herein.

FIG. 8 illustrates a diagrammatic representation of a machine in the example form of a computing device 800 within which a set of instructions, for causing the machine to perform any one or more of the methodologies discussed herein, may be executed. The computing device 800 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute playlist module 826 for performing the operations and steps discussed herein.

The computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and a signal generation device 816 (e.g., a speaker). In one embodiment, the video display unit 810, the alphanumeric input device 812, and the cursor control device 814 may be combined into a single component or device (e.g., an LCD touch screen).

The data storage device 818 may include a computer-readable storage medium 828 on which is stored one or more sets of instructions (e.g., playlist module 826) embodying any one or more of the methodologies or functions described herein. The playlist module 826 may also reside, completely or at least partially, within the main memory 804 and/or within the processing device 802 during execution thereof by the computing device 800, the main memory 804 and the processing device 802 also constituting computer-readable media. The instructions may further be transmitted or received over a network 820 via the network interface device 808.

While the computer-readable storage medium 828 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "subscribing," "providing," "determining," "unsubscribing," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
   identifying, by a processing device, a client device of a first user of a content sharing platform, wherein the content sharing platform comprises a plurality of media items;

identifying, by the processing device, a playlist of the first user, the playlist including a first subset of media items;
identifying, by the processing device, a second subset of media items of a second user;
detecting, by the processing device, an action performed by the first user with respect to at least one media item of the second subset of media items of the second user, wherein the action performed by the first user indicates interest of the first user in the at least one media item of the second user and comprises at least one of subscribing to a channel of the second user, approving a comment of the second user, commenting on a post of the second user, or indicating approval of content of the second user;
upon detecting the action performed by the first user with respect to the at least one media item of the second subset of media items of the second user, modifying, by the processing device, the playlist of the first user by automatically adding the at least one media item of the second subset of media items of the second user to the playlist of the first user, wherein the playlist of the first user is modified automatically without the first user selecting the at least one media item for the playlist;
storing, at the content sharing platform, the modified playlist of the first user; and
upon a request of the first user for the stored modified playlist, providing, by the processing device, playback of any media item from the stored modified playlist to the first user.

2. The method of claim 1, wherein the action performed by the first user further comprises a selection of a user interface (UI) option indicating subscription to the second subset of the media items of the second user, or a selection of a UI option indicating approval of the at least one media item.

3. The method of claim 1, further comprising:
prior to automatically adding the at least one media item of the second user to the playlist of the first user:
accessing preference information provided by the first user; and
determining that the at least one media item of the second user satisfies the preference information provided by the first user.

4. The method of claim 1, wherein the second subset of media items of the second user represents a channel of the second user or a playlist of the second user.

5. The method of claim 1, further comprising:
deleting the playlist of the first user in response to determining that the first user has not viewed a media item from the playlist of the first user for a threshold period of time.

6. The method of claim 1, wherein the action performed by the first user further comprises a request to add the second user to a set of social connections of the first user.

7. The method of claim 6, wherein the request to add the second user to the set of social connections of the first user pertains to the content sharing platform or to a platform other than the content sharing platform.

8. A system comprising:
a memory; and
a processing device, coupled to the memory, to perform operations comprising:
identifying a client device of a first user of a content sharing platform, wherein the content sharing platform comprises a plurality of media items;
identifying a playlist of the first user, the playlist including a first subset of media items;
identifying a second subset of media items of a second user;
detecting, by the processing device, an action performed by the first user with respect to at least one media item of the second subset of media items of the second user, wherein the action performed by the first user indicates interest of the first user in the at least one media item of the second user and comprises at least one of subscribing to a channel of the second user, approving a comment of the second user, commenting on a post of the second user, or indicating approval of content of the second user;
upon detecting the action performed by the first user with respect to the at least one media item of the second subset of media items of the second user, modifying, by the processing device, the playlist of the first user by automatically adding the at least one media item of the second subset of media items of the second user to the playlist of the first user, wherein the playlist of the first user is modified automatically without the first user selecting the at least one media item for the playlist;
storing, at the content sharing platform, the modified playlist of the first user; and
upon a request of the first user for the stored modified playlist, provide playback of any media item from the stored modified playlist to the first user.

9. The system of claim 8, wherein the action performed by the first user further comprises a selection of a user interface (UI) option indicating subscription to the second subset of the media items of the second user, or a selection of a UI option indicating approval of the at least one media item.

10. The system of claim 8, the operations further comprising:
prior to automatically adding the at least one media item of the second user to the playlist of the first user:
accessing preference information provided by the first user; and
determining that the at least one media item of the second user satisfies the preference information provided by the first user.

11. The system of claim 8, wherein the second subset of media items of the second user represents a channel of the second user or a playlist of the second user.

12. The system of claim 8, the operations further comprising:
deleting the playlist of the first user in response to determining that the first user has not viewed a media item from the playlist of the first user for a threshold period of time.

13. The system of claim 8, wherein the action performed by the first user further comprises a request to add the second user to a set of social connections of the first user on the content sharing platform or a platform other than the content sharing platform.

14. A non-transitory computer-readable medium storing instructions, which when executed by a processing device, cause the processing device to perform operations comprising:
identifying a client device of a first user of a content sharing platform, wherein the content sharing platform comprises a plurality of media items;
identifying a playlist of the first user, the playlist including a first subset of media items;
identifying a second subset of media items of a second user;
detecting, by the processing device, an action performed by the first user with respect to at least one media item of the second subset of media items of the second user, wherein the action performed by the first user indicates interest of the first user in the at least one media item of the second user and comprises at least one of subscribing to a channel of the second user, approving a comment of the second user, commenting on a post of the second user, or indicating approval of content of the second user;

upon detecting the action performed by the first user with respect to the at least one media item of the second subset of media items of the second user, modifying, by the processing device, the playlist of the first user by automatically adding the at least one media item of the second subset of media items of the second user to the playlist of the first user, wherein the playlist of the first user is modified automatically without the first user selecting the at least one media item for the playlist;

storing, at the content sharing platform, the modified playlist of the first user; and upon a request of the first user for the stored modified playlist, provide playback of any media item from the stored modified playlist to the first user.

15. The non-transitory computer-readable medium of claim 14, wherein the action performed by the first user further comprises a selection of a user interface (UI) option indicating subscription to the second subset of the media items of the second user, or a selection of a UI option indicating approval of the at least one media item.

16. The non-transitory computer-readable medium of claim 14, the operations further comprising:
prior to automatically adding the at least one media item of the second user to the playlist of the first user:
accessing preference information provided by the first user; and
determining that the at least one media item of the second user satisfies the preference information provided by the first user.

17. The non-transitory computer-readable medium of claim 14, wherein the second subset of media items of the second user represents a channel of the second user or a playlist of the second user.

18. The non-transitory computer-readable medium of claim 14, the operations further comprising:
deleting the playlist of the first user in response to determining that the first user has not viewed a media item from the playlist of the first user for a threshold period of time.

\* \* \* \* \*